(12) United States Patent
Moss

(10) Patent No.: US 6,741,096 B2
(45) Date of Patent: May 25, 2004

(54) STRUCTURE AND METHODS FOR MEASUREMENT OF ARBITRATION PERFORMANCE

(75) Inventor: Robert W. Moss, Longmont, CO (US)

(73) Assignee: LSI Logic Corporation, Milpitas, CA (US)

( * ) Notice: Subject to any disclaimer, the term of this patent is extended or adjusted under 35 U.S.C. 154(b) by 9 days.

(21) Appl. No.: 10/188,880

(22) Filed: Jul. 2, 2002

(65) Prior Publication Data

US 2004/0004495 A1 Jan. 8, 2004

(51) Int. Cl.[7] .................. H03K 19/173; G06F 1/04; G06F 12/00
(52) U.S. Cl. ............... 326/37; 326/37; 326/94; 710/124; 710/120; 710/123; 710/117; 713/502; 713/400; 711/158; 711/154
(58) Field of Search .................. 326/37, 94; 710/124, 710/120, 123, 117; 713/502, 400; 711/158, 154

(56) References Cited

U.S. PATENT DOCUMENTS 5,951,661 A * 9/1999 Tavallaei et al. ............ 710/105
6,415,369 B1 * 7/2002 Chodnekar et al. ......... 711/158
6,434,708 B1 * 8/2002 Dunnihoo et al. .......... 713/502
6,446,151 B1 * 9/2002 Fischer et al. .............. 710/124

* cited by examiner

Primary Examiner—Michael Tokar
Assistant Examiner—Vibol Tan

(57) ABSTRACT

Circuits and associated methods for operation thereof for gathering real-time statistical information regarding operation of the arbiter circuit in a particular system application. The real-time statistical information so gathered is useful for off-line analysis by a system designer for determining optimal configuration and parameter values associated with operation of a particular arbiter in a specific system application. In a first exemplary preferred embodiment, a timer circuit associated with the arbiter measures a predetermined period of time during which statistical data is to be gathered. Counter circuits associated with the arbiter count the number of occurrences of events of interest to the designer during the time period measured by the timer circuit. Each counter circuit preferably senses and counts a particular event of interest to the designer.

16 Claims, 6 Drawing Sheets

STRUCTURE AND METHODS FOR MEASUREMENT OF ARBITRATION PERFORMANCE

BACKGROUND OF THE INVENTION

1. Field of the Invention

The present invention relates generally to tuning of arbitration circuitry in a system and more specifically to circuit structures and methods within an arbiter circuit for gathering statistical information useful in tuning parameters associated with operation of the arbiter circuit.

2. Discussion of Related Art

In electronic systems it is generally known that multiple devices may share access to a common resource. For example, multiple master devices may communicate with multiple slave devices through a shared interface bus. Or for example, multiple master devices may exchange information with a shared memory device through a memory controller. In such systems it is common to utilize an arbiter circuit to arbitrate requests for temporary exclusive access by master devices for utilization of the shared resource. The arbiter generally receives requests for access to the shared resource from one or more of the multiple master devices and through any of several well-known techniques selects the next requesting master devices to receive temporary exclusive access to the shared resource. When a first master device completes its utilization of the shared resource, it relinquishes its temporary exclusive control over the shared resource by so signaling the arbiter. The arbiter then determines a next requesting master device to receive temporary exclusive control of the shared resource.

It is also generally known in the art that arbiter devices may have programmable parameters useful in tuning operation of the arbiter for specific system applications. For example, an arbiter may tune its operation to prefer master devices requesting exclusive control for purposes of write operations to a memory versus read operations, or vice versa. Or for example, an arbiter may tune its operation to preferred particular prioritized devices over lower priority master devices. Further, an arbiter may force a master device to relinquish temporary exclusive control in response to certain detected events such as expiration of a predetermined timeout, requests by other higher priority master devices, etc.

Determination of what programmable values and algorithms within and arbiter are to be selected for a particular system application can be a difficult process. Configuring an arbiter to function optimally in a particular system application requires observation over a period of time of the performance of the arbiter operating under various sequences, states and scenarios. Characteristics of the system in which the arbiter operates such as the type and quantity of data processed, execution parameters associated with the master devices requesting temporary exclusive control through the arbiter, etc. may change dramatically and dynamically through operation of the system. To properly analyze these parameters can require collection of significant amounts of representative data for subsequent analysis. Such data often cannot be determined by external observation of the results of the arbitration process. Rather, effective analysis requires acquisition of parameters and operation within the arbiter circuit per se.

Such information can often be acquired through simulation techniques stimulating operation of the arbiter in a simulated system environment. Simulation of complex circuits can be a time-consuming process because simulation of high-speed circuits is significantly slower than actual operation of the high-speed circuits. The time required for gathering representative data for analysis of optimal arbiter configuration further exacerbates the problem because the volume of data can be substantial. Meaningful statistical bases for configuration analysis require a large volume of representative data. Further, simulation techniques require the user to generate substantial volumes of input stimuli for the simulation process to generate desired sequences and scenarios for testing the arbiter. Creation of such input data sets (stimuli) to produce statistically meaningful analysis data can be difficult, especially when the properties of the data set (stimuli) may be altered by changes in the arbitration parameters.

External test and measurement equipment such as logic analyzers and oscilloscopes applied to external signals of the arbiter can detect events and count detected events over a predetermined period of time. However, such techniques generally cannot access internal information within the arbiter circuit per se. Rather, such external test and measurement equipment has visibility only to signals made available external to circuits on standard I/O pads of the circuit containing the arbiter. Addition of I/O pads for every signal related to the events of interest to the designer would add unacceptable cost and complexity to the design of the arbiter and its associated integrated circuit package.

It is evident from the above discussion that a need exists for improved methods and structures for measuring arbitration performance for purposes of tuning or reconfiguring arbitration techniques and parameters for particular system applications.

SUMMARY OF THE INVENTION

The present invention solves the above and other problems, thereby advancing the state of the useful arts, by providing methods and structures preferably integrated with the arbiter circuit for accumulating performance information during real-time execution of the arbiter circuit. In particular, the present invention in a first preferred embodiment provides a timer function integrated with the arbiter circuit for detecting a predetermined period of time over which statistical arbitration data may be accumulated. When the timer component indicates that statistical gathering is to take place, other data gathering circuits of the present invention detect particular sequences, states and signals (events) of interest to the designer and count the number of occurrences of each such event. Preferably, a plurality of such data gathering circuits are integrated with the arbiter circuit and coupled to the timer function to permit data gathering for a significant number of events of interest over an extended period of real-time arbiter operation. Off-line analysis of the gathered statistical data then permits improved configuration and selection of arbitration techniques and parameters for tuning arbitration in a particular system application.

Preferably, each data gathering circuit may be adapted flexibly to detect a variety of events of interest to the designer. Exemplary of such events to be counted are the number of clock cycles during arbitration operation during which a request is pending from any master device associated with the arbiter, the number of times read requests are followed by write requests and vice versa, the number of read requests and the number of write requests issued through the arbiter for the shared device, the number of arbiter cycles spent in a specific state of a particular state machine within the arbiter circuit, etc. Numerous other events of interest to a system designer will be readily apparent to those of ordinary skill in the art.

The architecture of the present invention provides for gathering of any and all such events and counting the number of occurrences of such events over a determined period of time.

A first feature of the invention provides a circuit for measuring statistical information regarding performance of an arbiter that arbitrates for access by multiple master devices to a shared resource, the circuit including: a programmable timer for counting a predetermined time period; and an event counter coupled to the programmable timer for counting the number of occurrences of a predetermined event within the arbiter.

Another aspect of the invention further provides a clear signal path coupled to the event counter such that a clear signal is applied to the clear signal path to reset the event counter when the programmable timer is started.

Another aspect of the invention further provides that the event counter is cleared by writing a zero value to the event counter.

Another aspect of the invention further provides that the event counter is cleared after being read by a host system.

Another aspect of the invention further provides a count enable signal path coupled to the event counter such that an enable signal is applied to the count enable signal path indicating that the predetermined time period has not yet expired in the programmable timer.

Another aspect of the invention further provides that the event counter counts events only when the enable signal is applied to the count enable signal path.

Another aspect of the invention further provides a plurality of event counters coupled to the programmable timer for counting the number of occurrences of a plurality of predetermined events within the arbiter.

Another aspect of the invention further provides that the event counter comprises: a counting circuit portion for counting a number of event signals applied as an input to the counting portion; and an event specific circuit portion coupled to the counting circuit portion for generating the event signals in response to sensing the predetermined event.

A second feature of the invention provides a method for tuning an arbiter for optimal performance in a system, the method comprising the steps of: enabling the counting of occurrences of predetermined events in the arbiter; operating the arbiter in the system; sensing occurrences of the predetermined events in the arbiter; counting sensed occurrences of the predetermined events in response to enabling of the counting; reading counts of the sensed occurrences; and reconfiguring parameters associated with operation of the arbiter based on analysis of the counts.

Another aspect of the invention further provides for clearing previously counted sensed occurrences.

Another aspect of the invention further provides that the step of clearing comprises the step of: clearing the previously counted sensed occurrences in response to the step of reading.

Another aspect of the invention further provides that the step of enabling comprises the step of writing a time period value to a timer register, and that the step of clearing comprises the step of clearing the previously counted sensed occurrences in response to the step of writing.

Another aspect of the invention further provides that the step of enabling comprises the step of writing a time period value to a timer register, and that the step of clearing comprises the step of writing a zero value to the event counter.

DETAILED DESCRIPTION OF THE PREFERRED EMBODIMENTS

Figure 1:
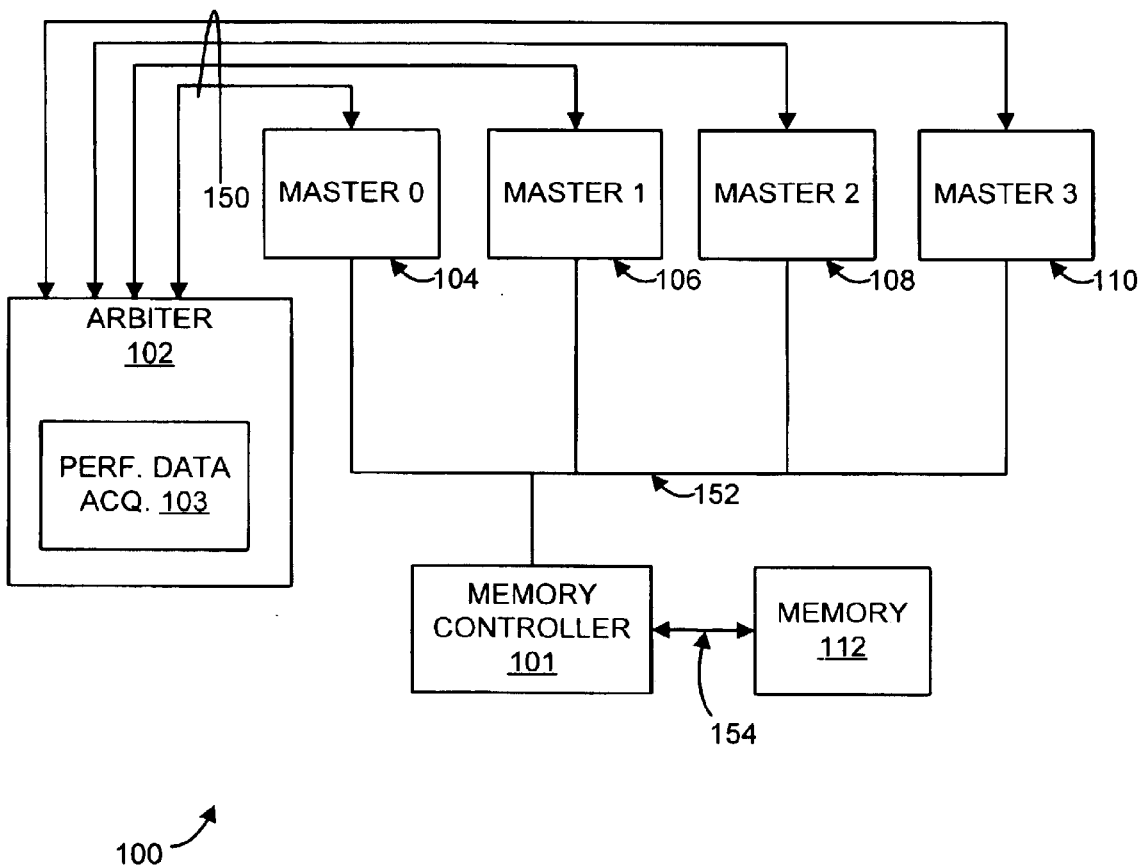
FIG. 1 is block diagram of a system with performance data acquisition features in accordance with the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram of a system 100 having the arbitration performance measurement features of the present invention within the arbiter associated with a memory controller. In particular, multiple master devices 104 through 110 share access to a common memory 112 through memory controller 101 over bus 152 and bus 154. More specifically, all master devices access memory 112 through interactions with memory controller 101. Master devices 104 through 110 issue memory requests (i.e., read and write commands) to memory controller 101. Arbitration and control signals are exchanged over bus 150 between the master devices and the memory controller 101. These arbitration and control signals determine which of multiple master devices simultaneously requesting access to the memory 112 will next be granted use of the memory.

Performance data acquisition 103 monitors particular events of interest to the designer to count the numbers of such events over a predetermined period of time. As noted above, such counts of events are useful to the designer to analyze statistical data to determine optimal configuration of the arbiter. In accordance with the present invention, data is gathered in real time during operation of the arbiter. On request from an external source (not shown) the gathered data is returned to a designer for analysis. Based on such analysis, the designer may determine optimal configurations and values for programmable parameters of the arbiter appropriate for a particular system application.

Figure 6:
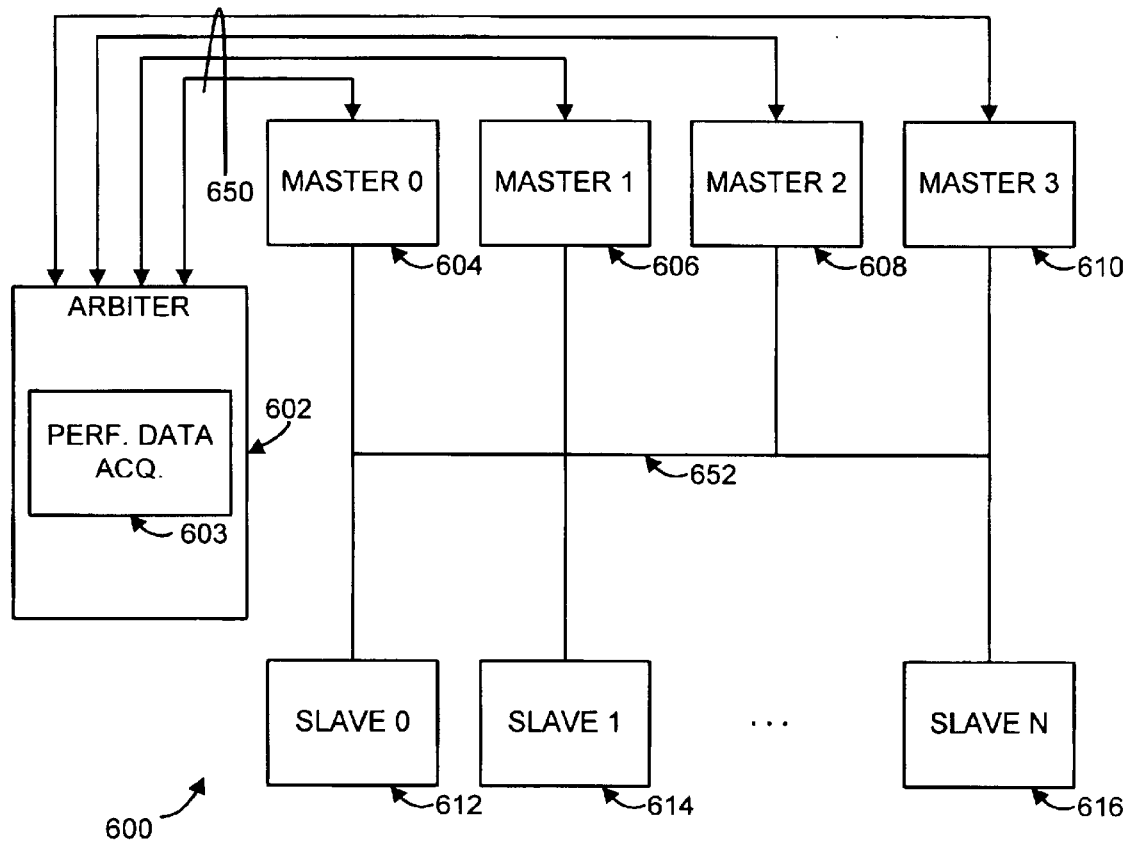
FIG. 6 is a block diagram of another system with performance data acquisition features in accordance with the present invention.

FIG. 6 is a block diagram of another system 600 in which the present invention may be advantageously applied. System 600 has multiple master devices 604 through 610 and multiple slave devices 612 through 616 coupled to a shared system bus 652. Arbiter 602 includes performance data acquisition element 103 in accordance with the present invention to gather statistical data relating to operation of the arbiter 602 in the system 600. As above, statistical counts are gathered over a period of time reflecting occurrence of particular arbitration events of interest to the system designer.

Request and grant signals associated with each master device 604 through 610 are exchanged with arbiter 602 via bus 650. In general, each master device 604 through 610 requests temporary exclusive control of bus 652 by applying a bus request signal to its associated signal path of bus 650. The arbiter 602 receives all such bus request signals from all master devices 604 through 610 and selects the next master device presently requesting temporary exclusive ownership of bus 652 to which the requested ownership will be granted. A grant signal is applied to an associated signal path of bus 650 to grant the request of the next selected master device.

Those skilled in the art will recognize that the system architectures depicted in FIGS. 1 and 6 are intended as exemplary of a wide variety of systems that may benefit from the performance data gathering techniques and structure of the present invention. In particular, those skilled in the art will recognize that any number of master or slave devices may be used in conjunction with such a system structure limited only by the specifications of the particular system structure or architecture selected by the designer.

Still further, those of ordinary skill in the art will recognize that any of several well-known system bus architectures may be selected for a system bus 152 or 652 and arbitration signals on bus 150 or 650. In particular, in one exemplary preferred embodiment, bus 150 and 152 together (or 650 and 652) may be an AMBA AHB compliant high-performance system bus architecture. A number of other common, commercial and proprietary bus structures may also benefit from the features of the present inventions. Those skilled in the art will further recognize that signals applied to the depicted buses are typically integrated in a single bus structure rather than two distinct bus structures as depicted in FIGS. 1 and 6. Signals applied to bus 150 or 650 are shown as separate from system bus 152 or 652 only to simplify the description in that signals applied to bus 150 or 650 relate exclusively to bus arbitration processing to exchange signals between master devices and the arbiter.

Further, those skilled in the art will recognize that the particular packaging suggested by FIGS. 1 and 6 wherein the performance data acquisition element is integrated within the arbiter circuit is a matter of design choice well-known to those skilled in the art. Key to the present invention, regardless of circuit packaging, is the monitoring of states and events internal to the arbiter design operating in real-time. Numerous equivalent packaging designs for the structure of the present invention will be readily apparent to those skilled in the art.

Figure 2:
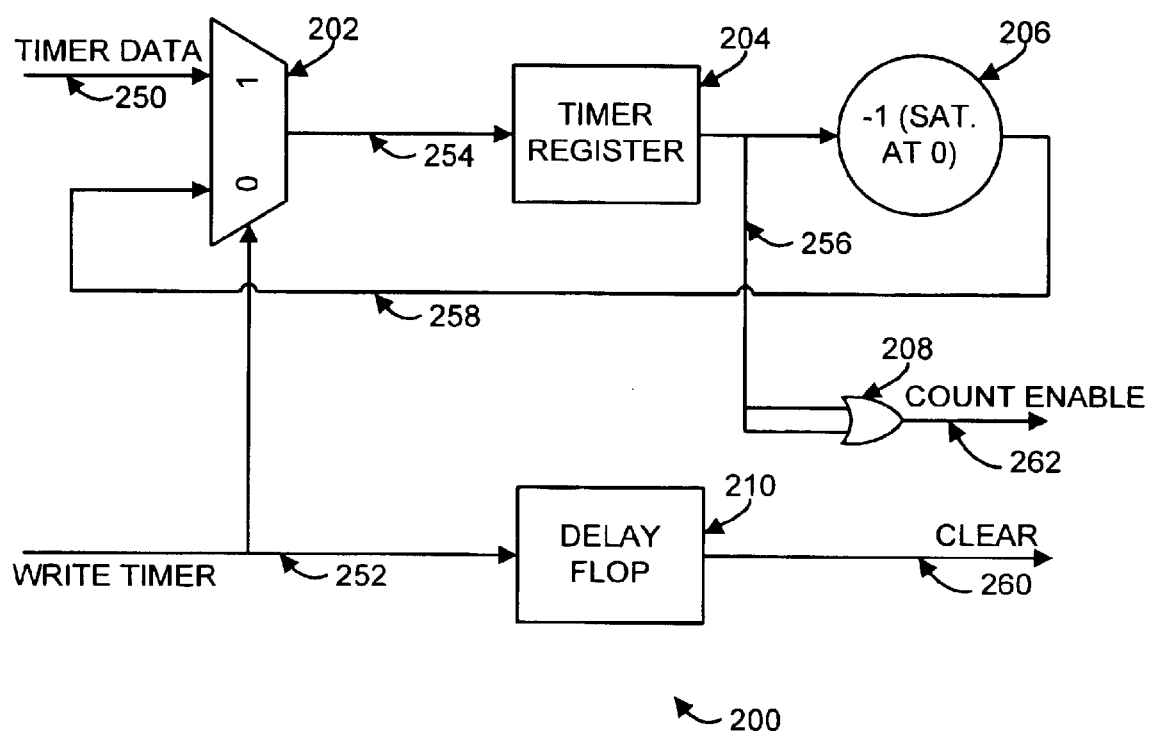
FIG. 2 is a diagram of a timer circuit portion of the performance data acquisition features of the present invention.

FIG. 2 is a block diagram of a statistics timer portion of the present invention. As noted above, a timer portion of the invention measures a predetermined period of time during which statistical information regarding real-time operation of the arbiter is to be acquired. The desired time duration value is preferably written to a register of the timer circuit and decremented on each pulse of the clock signal (not shown) supplied to the circuit. Those of ordinary skill in the art will recognize that any frequency clock signal may be applied to the circuit of FIG. 2 as appropriate for the desired time period for data acquisition. The unit of time represented by each clock signal pulse is therefore determined by the selected clock frequency.

In particular, the desired time duration is preferably applied to bus 250 by an appropriate controlling device (not shown). When the desired time duration value is so applied to bus 250, the controlling device applies a write timer signal on path 252. The signal on path 252 enables multiplexer 202 to apply the desired time duration value on bus 250 to its output bus 254 for loading into timer register 204. The present value in timer register 204 is applied to output bus 256 for further application to subtraction element 206. Subtraction element 206 preferably decrements its received input value from bus 256 and applies the decremented value to its output on bus 258. The subtraction element 206 is preferably of a design that "saturates" as the value is decremented to zero (in other words, subtraction element 206 does not attempt to decrement its input data value below zero). The decremented output value is applied through path 258 as a second input to multiplexer 202. When the write timer signal applied to path 252 is released, multiplexer 202 applies the decremented register value on path 258 to its output path 254 for application to timer register 204. This recirculating structure decrements the value in timer register 204 on each clock pulse (not shown) applied to thereto.

Those of ordinary skill in the art will recognize that the maximum duration of time permitted is a function of the width (in bits) of timer register 204 and the width of associated buses 250, 254, 256 and 258. In one exemplary preferred embodiment, 32-bit values are loaded in timer register 204 and transferred over the referenced buses. Still further, one exemplary preferred embodiment provides for a clock frequency of about 100 MHz applied to the timer circuits to allow for a maximum time duration of approximately 40 seconds.

The present output value of timer register 204 is also applied via bus 256 to OR gate 208. OR gate 208 ORs all bits of the timer register 204 output value to detect that the timer register value is zero or not zero. The output of OR gate 208 is applied to path 262 as a counter enable signal discussed further herein below. Those of ordinary skill in the art will recognize a variety of alternative embodiments for decrementing a timer register such that the register "saturates" at zero and to detect a terminal count of zero for application to the counter enable signal on path 262.

The write timer pulse signal applied by a controlling device to path 252 is also preferably applied to delay flip-flop 210. The pulsed signal is therefore delayed by one clock period and then applied to path 260 as a clear signal for all data acquisition event detection circuits as discussed further here in below. As noted, any frequency clock signal (not shown) may be used for clocking delay flip-flop 210. This allows all event sensor counters to be cleared when a new data acquisition period is defined by writing the timer register. Alternatively, a write of all zeros to each event counter could be used to clear the event counters or a clear-on-read function could be used to clear each event counter after it is read. Such design choices for selection of a clock signal for application and the frequency of such a clock signal is a matter of design choice well-known to those of ordinary skill in the art. In like manner, such design choices for an approach to clear the event counter(s) are well-known to those of ordinary skill in the art.

Figure 3:
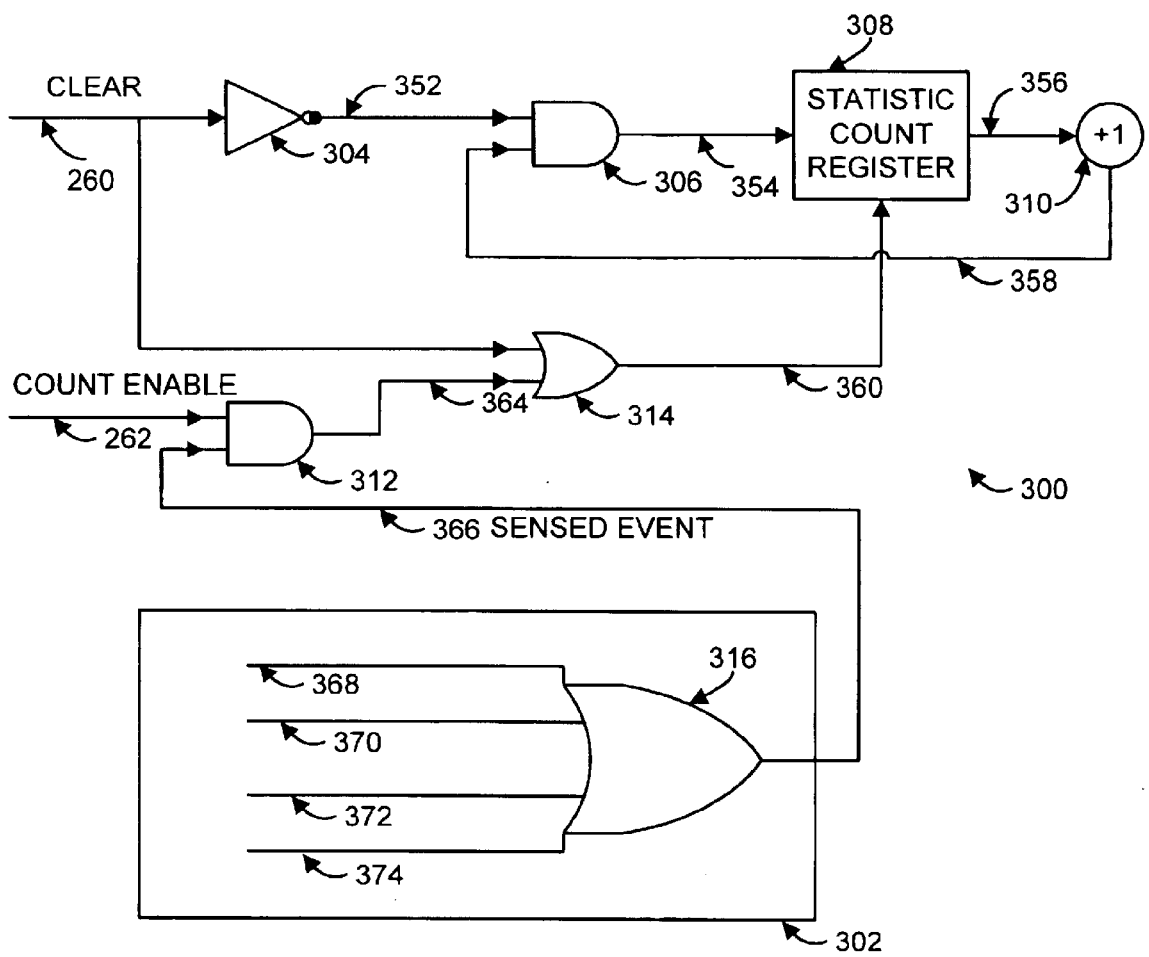
FIG. 3 is a diagram of a event detector and counter circuit to detect and count an exemplary event in accordance with the present invention.

FIG. 3 is a block diagram of a single data acquisition event counting circuit for counting a particular desired event. Counting portion 300 of the circuit of FIG. 3 is preferably a common design for each of multiple event gathering counters in the system. The particular event to be sensed is preferably provided in a event specific portion 302 unique to each event sensing counter structure of the system.

In a preferred embodiment, multiple circuits as depicted in FIG. 3 are provided, each including a counter portion 300 and a event specific portion 302 adapted to detect a particular event of interest for the designer.

Counting portion 300 preferably receives a clear signal on path 260 used to reset the incrementing count register 308. The clear signal pulse on path 260 is preferably applied to inverter 304 to generate an inverted clear signal on path 352 applied as a first input to AND gate structure 306 discussed further herein below.

Counter 308 loads the present value applied to its input path 354 when clocked by an enable signal applied to its input path 360. The enable signal on path 360 is generated as the output of OR gate 314. OR gate 314 receives the clear signal pulse on path 260 as one input and the output of AND gate 312 as its other input.

The present value in counter register 308 is applied via path 356 to incrementer 310. Incrementer 310 adds one to the value and applies the incremented count value to its output path 358 as an input to AND gate structure 306. AND gate structure 306 preferably represents a plurality of AND gates each of which receives one bit of the incremented count value on bus 358 as a first input and the inverted clear signal pulse on path 352 as a second input. In a preferred exemplary embodiment, bus 358 is 32 bits wide and thus AND gate structure 306 provides 32 AND gates each receiving a corresponding bit of the incremented count value and the inverted clear signal as inputs. The thicker line representing bus 358 suggests such a structure to those of ordinary skill in the art.

AND gate structure 306 therefore provides an output value of zero on bus 354 when the clear signal on path 260 is asserted (logic one) and provides the present incremented counter value as an output value on bus 354 when the clear signal on path 260 is not asserted (logic zero). The zero value output from AND gate structure 306 when the clear signal 260 is asserted is loaded into counter register when so enabled by the output of OR gate 314. This effectively resets the counter register 308 when the timer structure of FIG. 2 is first started (i.e., at the start of the data acquisition period).

The incremented value output from AND gate structure 306 is loaded into counter register 308 from bus 354 when so enabled by the output of OR gate 314 in response to the output of AND gate 312. AND gate 312 receives the count enable signal on path 262 as a first input and a sensed event signal on path 366 from event specific portion 302. The count enable signal on path 262 is generated by the timer portion of FIG. 2 above when data acquisition is started and the time duration is not completed (i.e., timer register of FIG. 2 is not yet at the terminal count value). Each sensed event signal pulse applied to path 366 by event specific portion 302 therefore causes count register 308 to increment by one. Those skilled in the art will also recognize that a level signal on path 366 (as distinct from a pulsed signal) may be useful where an event to be sensed relates to a period of time that an event is active or a percentage or duty cycle measure is desired.

Event specific portion 302 senses occurrence of an event of interest to the designer. Any number of events may be detected by appropriate logic structures integrated with the arbiter device. Event specific portion 302 as shown is therefore intended as merely exemplary of one type of event of interest to the designer for tuning the configuration of an associated arbiter in a system application.

Event specific portion 302 as shown is intended to detect a clock cycle of the arbiter where any master device is requesting access to the shared resource managed by the arbiter. In particular, OR gate 316 receives the request signals from each master device in the system on paths 368 through 374. OR gate 316 then generates an output signal on path 366 indicating that some master device is presently requesting access to the shared resource. Those skilled in the art will recognize that any number of master device requests may be applied as inputs to the OR gate.

Those skilled in the art will recognize event specific portion 302 as merely exemplary of one possible event to be sensed. Numerous other events and appropriate logic to sense such events will be readily apparent to those of ordinary skill in the art. Further, features and structure of the particular arbiter design for which statistics are to be gathered will affect the nature of events to be sensed and the structure of logic within event specific portion 302 required to sense the events.

The following list provides other exemplary events of potential value for data gathering and analysis by counting the number of such events using a structure such as depicted in FIG. 3:

- number of clock cycles with an outstanding request from any master device (302 of FIG. 3)
- number of times a read request is followed by a write request
- number of times a write request is followed by a read request
- number of clock cycles with a command awaiting a grant by the arbiter
- number of times a read command is issued to a shared resource
- number of times a write command is issued to a shared resource
- number of clock cycles the arbiter is in a specified state of a state machine
- number of clock cycles when the arbiter is idle
- number of clock cycles when the arbiter is stalled
- number of times when a signal becomes active (i.e., page hit, FIFO full, etc.)
- number of clock cycles where a signal remains active (i.e., page hit, FIFO full, etc.)

Those skilled in the art will recognize the above list provides further examples of events of interest where an arbiter is used to control access to a shared memory or other shared resource. Those skilled in the art will recognize that the list is not intended as limiting but merely as suggestive of other types of events of interest to a designer in optimizing the application of an arbiter circuit to a particular system environment. Logic circuits within an event specific portion 302 useful for detecting such events will be readily apparent to those of ordinary skill in the art.

Figure 4:
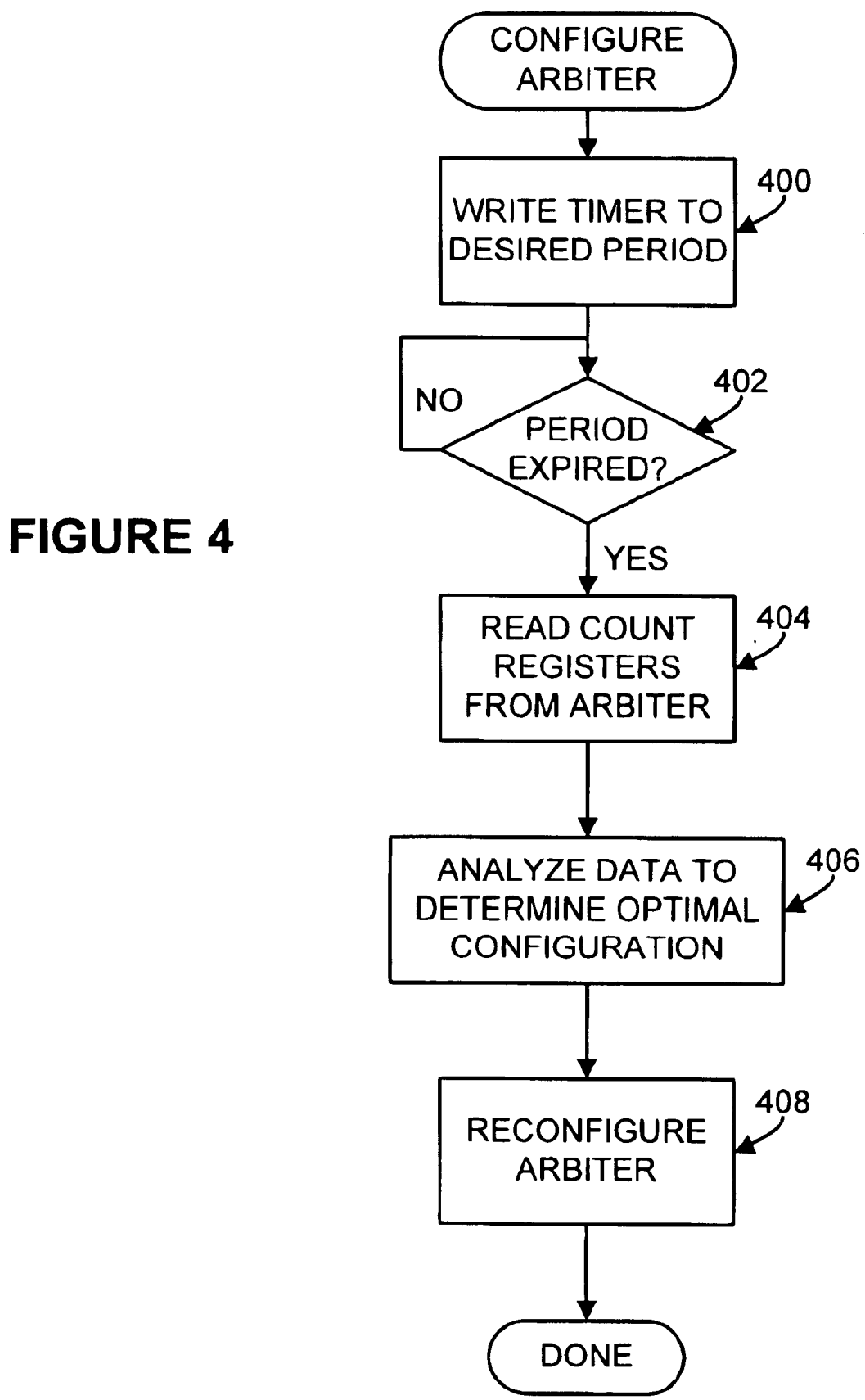
FIG. 4 is a flowchart describing use of the gathered performance information to optimize system performance.

FIG. 4 is a flowchart describing a method of the present invention to use the performance data acquired by the structures described above. The method of FIG. 4 is preferably operable in a processor coupled to the arbiter. In general, the processor programs the time duration to start the data acquisition and then reads the various count registers when the data acquisition period is completed. An I/O interface appropriate to permit such a processor to write the time duration register in the arbiter and to read such statistical information would be readily apparent to those of ordinary skill in the art.

Element 400 is first operable to start the data gathering processing of the system arbiter by programming a time duration for the acquisition process. Element 402 then awaits completion of the data gathering. Completion may be determined by simply waiting for the designated acquisition time duration to expire or may be sensed from a signal provided by the data acquisition features of the arbiter. When the data acquisition is completed, element 404 then reads the gathered count data from the arbiter count registers. Element 406 represents analysis of the acquired data by the system designer to determine optimal configuration and application of the arbiter in the present system. Lastly, element 408 represents steps by the designer to adapt the configuration of the arbiter in the present system for optimal use in view of the acquired data.

Figure 5:
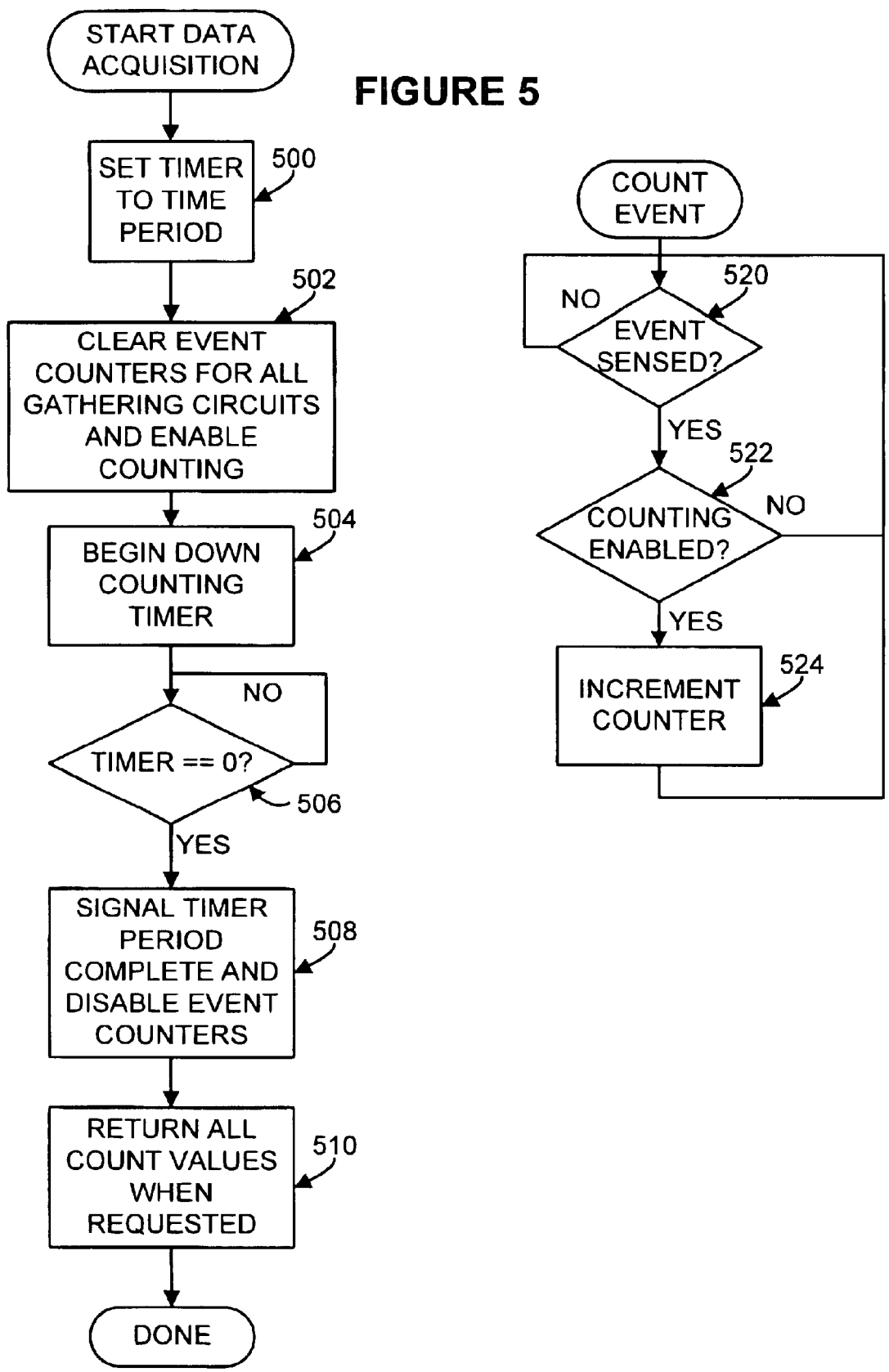
FIG. 5 is a flowchart describing operation of the data acquisition circuits of the present invention.

FIG. 5 provides flowcharts of methods of the present invention operable within the arbiter performance data gathering structures to start data acquisition and counting of events of interest. Element 500 sets the timer count register to the value provided by a controlling device (i.e., a processor) coupled to the arbiter. Element 502 then resets all event counters associated with the arbiter data gathering structures. As noted above, setting the timer register may trigger the clearing of the event counters. Alternatively, the event counters may be programmable set or cleared by the controlling processor. Such design choices are well-known to those of ordinary skill in the art. Further, element 502 signals the several event counters that counting of events is now enabled.

The time counter begins counting down the programmed time period at element 504. Element 506 awaits the expiration of the programmed time duration represented by the counter reaching terminal count (i.e., zero). As noted above, the duration of the timer period is a function of the count value and the particular signal frequency of the clock signal applied to the timer counting circuits. Element 508 then generates a signal indicating that the time period has expired to thereby stop (disable) the event counters and to signal the controlling device (i.e., processor) coupled to the arbiter that it may now read the acquired data. Element 510 then returns the gathered count data in response to a request to do so from the controlling device.

Element 520 through 524 represent the processing of an exemplary event counter (an event specific portion of the counter circuits). As noted above, multiple event counter circuits are preferably associated with the performance data gathering structures of the present invention. The method of elements 520 through 524 is therefore duplicated and operable in parallel in each such event counter of the structure.

Element 520 is operable to await sensing of a specified event. As noted, the logic to sense a particular event is unique to the specific event and to the arbiter with which the data gathering structures are integrated. Once such an event is sensed, element 522 is operable to determine whether counting is presently enabled. If not, processing continues by looping back to element 520 to await sensing of another event. If enabled, processing continues with element 524 to increment the corresponding event counter and then to loop back to element 520 to await sensing of another event.

Those of ordinary skill in the art will recognize numerous equivalent methods for setting the time period of acquisition, resetting counters, starting the event counting process and stopping the event counting. Such design choices are readily apparent to those of ordinary skill in the art.

While the invention has been illustrated and described in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A circuit for measuring statistical information regarding performance of an arbiter that arbitrates for access by multiple master devices to a shared resource, said circuit including:
    a programmable timer for counting a predetermined time period; and
    a plurality of event counters coupled to said programmable timer for counting the number of occurrences of a plurality of predetermined events within said arbiter.

2. The circuit of claim 1 further comprising:
    a clear signal path coupled to a corresponding event counter of said plurality of event counter wherein a clear signal is applied to said clear signal path to reset said corresponding event counter when said programmable timer is started.

3. The circuit of claim 1 wherein amid an event counter of said plurality of event counters is cleared by writing a zero value to said event counter.

4. The circuit of claim 1 wherein an event counter of said plurality of event counters is cleared after being read by a host system.

5. The circuit of claim 1 further comprising:
    a count enable signal path coupled to a corresponding event counter of said plurality of event counters wherein an enable signal is applied to said count enable signal path indicating that said predetermined time period has not yet expired in said programmable timer.

6. The circuit of claim 5 wherein an event counter of said plurality of event counters counts events only when said enable signal is applied to said count enable signal path.

7. The circuit of claim 1 wherein each event counter of said plurality of event counters comprises:
    a counting circuit portion for counting a number of event signals applied as an input to said counting portion; and
    an event specific circuit portion coupled to said counting circuit portion for generating said event signals in response to sensing said predetermined event.

8. A method for tuning an arbiter for optimal performance in a system, said method comprising the steps of:
    enabling the counting of occurrences of a plurality of predetermined events in said arbiter
    operating said arbiter in said system;
    sensing occurrences of said plurality of predetermined events in said arbiter;
    counting sensed occurrences of said plurality of predetermined events in response to enabling of the counting;
    reading counts of said sensed occurrences; and
    reconfiguring parameters associated with operation of said arbiter based on analysis of said counts.

9. The method of claim 8 further comprising:
    clearing previously counted sensed occurrences.

10. The method of claim 9 wherein the step of clearing comprises the step of:
    clearing said previously counted sensed occurrences in response to the step of reading.

11. The method of claim 9
    wherein the step of enabling comprises the step of writing a time period value to a timer register, and
    wherein the step of clearing comprises the step of clearing said previously counted sensed occurrences in response to the step of writing.

12. The method of claim 9
wherein the step of enabling comprises the step of writing a time period value to a timer register, and
wherein the step of clearing comprises the step of writing a zero value to said event counter.

13. A system comprising:
a plurality of master devices;
a shared resource;
an arbiter coupled between said plurality of master devices and said shared resource for arbitrating among said plurality of masters for access to said shared resource; and
a plurality of performance monitoring circuits associated with said arbiter to acquire statistical information regarding operation of said arbiter wherein each of said plurality of performance monitoring circuits measures a different aspect of the statistical information.

14. The system of claim 13 wherein said each of said performance monitoring circuits include:
an event detector for detecting occurrence of a predetermined event in said system; and
an event counter coupled to said event detector for counting occurrences of detected events of said predetermined events.

15. The system of claim 14 wherein said event detector detects a number of occurrences of said predetermined event.

16. The system of claim 14 wherein said event detector detects duration of occurrences of said predetermined event.

* * * * *